(12) United States Patent
Fanton et al.

(10) Patent No.: US 6,995,892 B2
(45) Date of Patent: *Feb. 7, 2006

(54) ELECTRICALLY CONTROLLABLE DEVICE HAVING VARIABLE OPTICAL AND/OR ENERGY PROPERTIES

(75) Inventors: Xavier Fanton, Aulnay-sous-Bois (FR); Alexander Oehrlein, Herzogenrath (DE)

(73) Assignee: Saint-Gobain Glass France, Courbevoie (FR)

(*) Notice: Subject to any disclaimer, the term of this patent is extended or adjusted under 35 U.S.C. 154(b) by 0 days.

This patent is subject to a terminal disclaimer.

(21) Appl. No.: 11/064,095

(22) Filed: Feb. 24, 2005

(65) Prior Publication Data

US 2005/0168794 A1    Aug. 4, 2005

Related U.S. Application Data

(63) Continuation of application No. 10/468,457, filed as application No. PCT/FR02/00707 on Feb. 27, 2002.

(30) Foreign Application Priority Data

Mar. 7, 2001    (FR) .................................. 01 03090

(51) Int. Cl.
  G02F 1/15    (2006.01)
  G02F 1/153   (2006.01)
(52) U.S. Cl. ..................... 359/265; 359/267; 359/270; 359/275
(58) Field of Classification Search ................ 359/245, 359/265–275; 252/582, 586; 313/506; 429/304; 436/518

See application file for complete search history.

(56) References Cited

U.S. PATENT DOCUMENTS

| | | | |
|---|---|---|---|
| 4,844,591 A | | 7/1989 | Arribart et al. |
| 5,071,233 A | | 12/1991 | Habib et al. |
| 5,086,351 A | | 2/1992 | Couput et al. |
| 5,130,841 A | * | 7/1992 | Demiryont .................. 359/265 |
| 5,239,406 A | | 8/1993 | Lynam |
| 5,444,330 A | * | 8/1995 | Leventis et al. ............ 313/506 |
| 5,507,965 A | | 4/1996 | Padoy et al. |
| 5,724,175 A | | 3/1998 | Hichwa et al. |
| 5,985,486 A | | 11/1999 | Giron |
| 6,039,390 A | | 3/2000 | Agrawal et al. |
| 6,251,690 B1 | * | 6/2001 | Kulmala et al. ............ 436/518 |

(Continued)

FOREIGN PATENT DOCUMENTS

DE    199 20 942    11/2000

(Continued)

*Primary Examiner*—Georgia Epps
*Assistant Examiner*—Jack Dinh
(74) *Attorney, Agent, or Firm*—Oblon, Spivak, McClelland, Maier & Neustadt, P.C.

(57) ABSTRACT

The subject of the invention is an electrically controllable device comprising at least one substrate provided with a functional stack of layers comprising at least two active layers separated by an electrolyte. The stack is placed between a lower electrode and an upper electrode. The device comprises n regions which are independently electrically controllable, using the lower electrode having a pattern A in one or two dimensions, the stack of layers, at least one of the active layers and the electrolyte of which having a pattern B in two dimensions, the upper electrode having a pattern C in two dimensions, so that the superposition of the patterns A, B and C, defines said n regions, with a physical discontinuity between two adjacent regions at least both at the level of the upper electrode and at the level of one of the active layers and of the electrolyte.

17 Claims, 8 Drawing Sheets

U.S. PATENT DOCUMENTS

Figure 1:
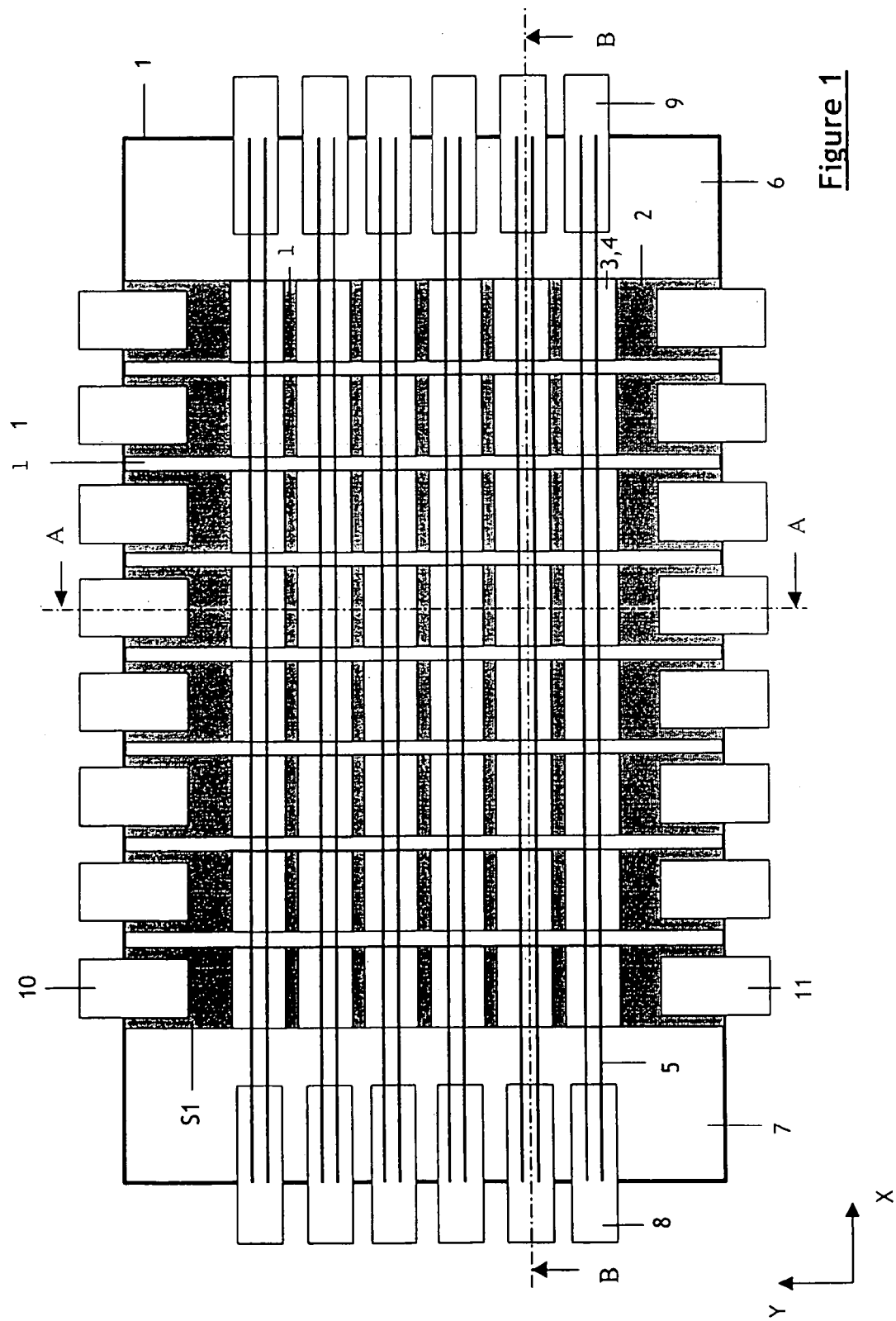

| | | | |
|---|---|---|---|
| 6,277,523 B1 * | 8/2001 | Giron ..................... | 429/304 |
| 6,337,758 B1 | 1/2002 | Beteille et al. | |
| 2004/0053125 A1 | 3/2004 | Giron et al. ............ | 429/152 |
| 2005/0041276 A1 | 2/2005 | Beteille et al. ......... | 359/245 |

FOREIGN PATENT DOCUMENTS

| | | |
|---|---|---|
| EP | 0 253 713 | 1/1988 |
| EP | 0 483 893 | 5/1992 |
| EP | 0 612 826 | 8/1994 |
| EP | 0 670 346 | 9/1995 |
| EP | 0 831 360 | 3/1998 |
| EP | 0 867 752 | 9/1998 |
| WO | 95/13600 | 5/1995 |
| WO | 98/08137 | 2/1998 |
| WO | 98/29781 | 7/1998 |
| WO | 00/03289 | 1/2000 |
| WO | 00/57243 | 9/2000 |

* cited by examiner

View AA

View BB

ELECTRICALLY CONTROLLABLE DEVICE HAVING VARIABLE OPTICAL AND/OR ENERGY PROPERTIES

This application is a Continuation Application of U.S. patent application Ser. No. 10/468,457, filed on Nov. 24, 2003, which is a National Stage Application of PCT/FR02/00707, filed on Feb. 27, 2002.

The invention relates to electrically controllable devices having variable optical and/or energy properties. It relates more particularly to devices using electrochromic or viologen-based systems, operating in transmission or in reflection.

Examples of viologen-based systems are described in U.S. Pat. No. 5,239,406 and EP-612 826.

Electrochromic systems have been very widely studied. They generally comprise, in a known manner, two layers of electrochromic materials separated by an electrolyte and framed by two electrodes. Under the effect of an electrical power supply, each of the electrochromic layers may reversibly inject cations, which leads to a modification of its properties (for example, for tungsten oxide, a change in color from a pale blue to a dark blue).

The most promising electrochromic systems are the "all-solid" systems, that is to say those whose layers, and particularly the electrolyte, are all of an essentially mineral nature: in fact it is possible to deposit all the layers successively on the same substrate, by the same type of technique, in particular sputtering. Examples of these all-solid systems are detailed in patents EP-867 752, EP-831 360, WO 00/03289 and WO 00/57243.

There are also other electrochromic systems, in particular those where the electrolyte is a polymer-based or a get-based layer, the other layers generally being mineral (reference may be made, for example, to patents EP-253 713 and EP-670 346).

There are also other electrochromic systems where all the layers are polymer-based, these are then referred to as "all-polymer" systems.

The invention relates in particular to the "all-solid" electrochromic systems.

Many applications have already been envisioned for these systems. Most generally, this has involved employing them as glazing for the building industry or as glazing for a vehicle, in particular as sunroofs, or else as anti-dazzle rear-view mirrors, then operating in reflection rather than in transmission.

Other applications can now be envisioned, which require the juxtaposition of a plurality of electrochromic systems, most particularly in order to use them as display means or in order to darken a glazed electrochromic surface only locally (for example to counter local glare). It is therefore desirable to have a greater degree of freedom in the way in which an electrochromic system is able to darken, and it is sought to be able to control this optical/energy change locally and selectively.

It will be sought to alter the energy properties of the system when aiming for thermal comfort inside a passenger compartment or a building. It will be sought to alter the optical properties when improvement of visual comfort is involved or when a display device is involved.

Patent application WO 98/29781 discloses an electrochromic system broken down into regions which can be selectively activated. The electrical power supply to each of these regions has not, however, been studied in detail.

Patent application WO 98/08137 also discloses a glazing called chromogenic glazing, consisting of the juxtaposition of two chromogenic systems. These two systems are assembled, in particular to form a vehicle sunroof, effectively having two regions the color level of which can be modified one independently of the other.

The aim of the invention is therefore to design an electrically controllable system with variable optical/energy properties, of the electrochromic type, divided into regions which can be controlled/activated selectively and separately from each other. More specifically, the aim of the invention is to design a system of this sort whose electrical power supply is better, in particular more efficient, and/or more reliable and/or easier to produce and/or more esthetic and discreet than the electrical power supplies which have been able to be studied until now.

The subject of the invention is therefore an electrically controllable device with variable transmitting or reflecting optical/energy properties comprising at least one carrier substrate provided with a functional stack of layers comprising at least two active layers separated by an electrolyte, said stack being placed between a lower electrode and an upper electrode ("lower" corresponding to the electrode nearer to the carrier substrate, as opposed td the "upper" electrode which is further from said substrate). The device comprises n regions ($n \geq 2$) which can be electrically controlled each independently of other, using the following means:

- the lower electrode has a pattern A in one or two dimensions, in particular obtained by etching the layer or by direct deposition of the layer in the desired pattern (in particular by photolithographic etching),
- the functional stack of layers is such that at least one of the active layers and the electrolyte (preferably all the layers of the stack) have a pattern B in two dimensions, in particular obtained by simultaneous etching of the layers (for example, by mechanical etching or using a laser),
- the "upper" electrode has a pattern C in two dimensions, in particular obtained in the same way as the pattern B mentioned above.
- these various patterns A, B and C define, by their superposition, the n regions, with a physical discontinuity between two adjacent regions at least both at the level of the upper electrode and at the level of one of the active layers and of the electrolyte of the functional stack of layers.

In the sense of the invention, a "pattern" means that the layer in question has discontinuities and cut lines, according to a given pattern.

Advantageously, the patterns B and C are identical, obtained simultaneously by the same method of etching the assembly consisting of the functional stack of layers and by the upper electrode. In particular, a pattern in the form of a periodic tiling in two dimensions is involved. The simplest geometrical shape consists in adopting a tiling defining a plurality of juxtaposed "active" squares. Any other geometrical shape may be used in the place of squares, in particular, any polygon, rectangle, triangle, hexagon or closed curved shape, such as a circle, an oval, etc.

In particular, any regular tiling spaced in two dimensions, which may be defined as the intersection between two families of curves, it being possible for these curves to be straight, broken or undulating, may be chosen. When straight lines intersecting at 90° are involved, squares or rectangles are obtained. When they intersect at any angle, parallelograms are obtained. Hexagons or any other polygon are obtained with broken lines.

The pattern A may be produced according to two variants: either a periodic tiling in one dimension, or in two dimensions, a tiling of the type adopted for the patterns B and C.

Alt the patterns A, B, C will thus define pixels with two-dimensional addressing, in two directions XY, which are in particular mutually orthogonal. As has been seen above, the shape of the pixels depends on the type of tiling chosen for the patterns A, B and C, and may take varied shapes (square, rectangle, any polygon, hexagon, or a shape at least partially curved and closed). The size of the pixels depends on the desired application and must be compatible with industrial production. These pixels or regions may have a surface area of, for example, between a few square centimeters each and a square millimeter each. They may also be much larger. Thus the system as a whole may have a surface area of 0.5 to several square meters, and comprise only two to four regions (of identical or different sizes).

Once the regions or pixels are obtained by means of the patterns A, B, C, the design of the electrical power supply must be effective while remaining sufficiently simple. It is for this reason that the power supply to the regions/pixels is different for the lower electrode and for the upper electrode.

This is because, on the side of the upper electrode, each pixel is electrically insulated from the adjacent pixel, since the upper electrode is etched and discontinuous at the boundary between each pixel. Therefore there are pads which have to be electrically connected. One solution consists in treating the pixels as rows of pixels in a given direction X, and to make sure that all the pixels of the same row are at an equipotential at the level of the upper electrode. The electrical continuity between the pixels of each row is then ensured by the presence of electrical conductors, in the form of at least one strip or at least one wire per row of pixels and which are in contact with the upper electrode. These conductors are therefore deposited above and along each of the rows of pixels.

If wires are involved, they are usually made of metal and with a diameter of between 10 $\mu$m and 100 $\mu$m. The choice of the diameter and/or of the number of wires per row of pixels is then a matter of compromise between the level of electrical conduction required and the desire that these wires are the least visible as possible.

If strips are involved, they may be layers of doped metal oxide (tin-doped indium oxide, ITO, for example) which have been previously deposited on strips of flexible polymer (for example made of polyethylene terephthalate, PET) and which are pressed onto each of the rows of pixels in question.

It is also possible to use a grid, one frame of which consists of conducting wires and the other frame of which consists of insulating wires, from the electrical standpoint. Preferably, the wires or the strips go beyond each of the rows at each of the ends: thus, it becomes easy to provide the electrical connection via clips, for example, with a voltage generator. The current supplies of the clip type are thus taken completely out of the region of the substrate covered with the functional stack of layers. It is simpler to supply them with current and the active part of the electrically controllable device is not affected optically, it is not "narrowed".

Advantageously, the conducting wires or the conducting strips are kept in contact with the upper electrode of the rows of pixels using a sheet of thermoplastic polymer of the polyurethane, PU, polyvinyl butyral, PVB or ethylene/vinyl acetate, EVA, type.

This sheet may act as a sheet for assembly to another rigid substrate of the glass type, by the technique known for manufacturing laminated glazing.

With regard to the lower electrode, according to a first variant, it therefore has a one-dimensional pattern. This pattern is preferably a set of lines in the Y direction, which define columns of pixels, all the pixels of the same column being at an equipotential at the level of the lower electrode.

Advantageously, the rows of pixels in the X direction, mentioned above, and the columns of pixels in the Y direction are mutually orthogonal and linear. Advantageously, they have the same pitch, or a substantially identical pitch.

Each of the columns of pixels is supplied with electrical current using current supply means of the clip type in electrical contact with the lower electrode at the end of each of said columns. At the level of the lower electrode, these columns are electrically insulated from each other because of these etched lines which make the layer discontinuous.

To facilitate the placement of the clips, provision is preferably made for the lower electrode to go beyond the end of each of the columns of pixels. The clip/lower electrode electrical contact is thus outside the region covered by the active layers of the functional stack. Here again, these clips prevent the active surface of the device from "narrowing".

According to a second variant, the lower electrode has a two-dimensional pattern, each pixel having, on the same side as the lower electrode, an independent electrical power supply.

This independent power supply may be made by means of conducting wires (or thin strips) connected and deposited by photolithographic etching or etched (these wires may also be added to the pattern of the lower electrode and consist of the same material). This power supply is preferably provided by suitable etching of the lower electrode.

If necessary, the electrical power supply of the device according to the invention may resort to the multiplexing technique. This technique is recommended, especially in the case where the pattern of the lower electrode is only one-dimensional.

Advantageously, each region or pixel of the device according to the invention may be independently activated electrically, by means of a suitable electrical power supply which may be started manually, or driven using electronic/ computing means. All will depend on the intended application.

As mentioned above, the most advantageous way of placing the current supplies consists in depositing them outside the carrier-substrate region which is covered with the functional stack of layers. This is made possible, especially if conducting thin strips/wires are used on the same side as the upper electrode, and if the lower electrode has a surface area larger than the surface area covered by the functional stack of layers, at least along two of its edges if said surface is a parallelogram.

A first advantageous application of the device according to the invention relates to vehicle sunroofs, especially for automobiles and trucks. This is because it is possible to create a sunroof in a single piece, but divided, for example, into two regions or into four regions. Thus, a sunroof with two regions parallel to the axis of the automobile makes it possible for the passenger and for the driver of the vehicle to choose, each as he desires, the degree of color of the portion of the sunroof above his head. Similarly, it is also possible to apply the invention to the vehicle side windows and rear windows.

A second application, still in the field of vehicles, consists in fitting the device in the top part of the windshield, especially in the form of one or more strips following the contour of the windshield in its upper part. Thus, these strips are advantageously permanently substituted for the colored strips often used to prevent the driver from being inconvenienced by the sun: it is thus possible to control the degree of color of the upper part of the windshield as desired according to the amount of sun. It is also possible to envision automated coloring in the case of sunshine, for example, using a control loop and a light sensor housed in the windshield.

A third application consists in locating the device according to the invention somewhat in the mid part of the windshield, in the driver's region of vision, in the form of a plurality of small pixels. The benefit prevents the driver from being dazzled at night by the headlights of an automobile coming in the opposite direction, by automatically and selectively darkening an appropriate number of pixels at the desired moment. These pixels may be controlled using at least one camera and/or one light sensor.

A fourth application consists in using the device as a display panel for graphical and/or alphanumeric information, for example, as a road information panel, which makes it possible to display information intermittently, for example. It is also possible to use it for mobile or non-mobile telephony screens.

Another application relates to glazing for buildings, in order to be able to darken only part of the glazing in question, without darkening the rooms too much. This is of more particular benefit in the Nordic countries where the sun is low for a large part of the year.

There are many other applications, in particular aircraft windows and windshields, roof windows of buildings and rear-view mirrors may be mentioned. The invention may also be used in the ophthalmic field (sport glasses, corrective or noncorrective glasses).

It is also possible to apply the systems according to the invention so that they operate in reflection rather than in transmission. It may involve mirrors, of which the rear-view mirrors mentioned above are an example, but which may also be large.

It may also involve systems where one of the substrates "framing" the electrically active system is opaque, or at least opacified. It may involve a bulk-tinted substrate, for example made of an opaque polymer (preferably light-colored). It may also involve a transparent substrate (polymer, glass) which can be opacified on the rear face by an opacifying coating, for example, a layer of paint (such as titanium oxide-based white paint), or any other lacquer or varnish. The benefit of this embodiment consists especially in being able to make a message, a logo, or a drawing appear, in contrast with the white or light-colored background conferred by this opacifying coating.

The subject of the invention is also the method for manufacturing this device, especially that making it possible to obtain the patterns A, B, C mentioned above. The layers may be etched by ablation using mechanical means (blades) or by laser ablation. It is also possible to obtain directly discontinuous layers with the desired pattern, for example by photolithographic etching.

Figure 2:
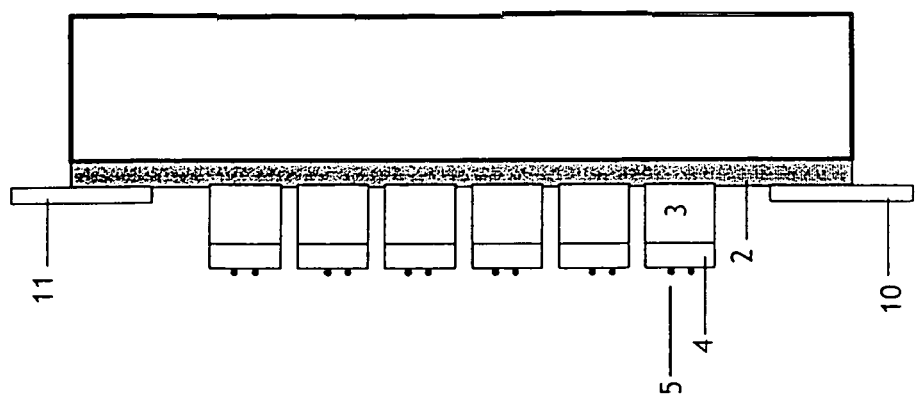
Figure 3:
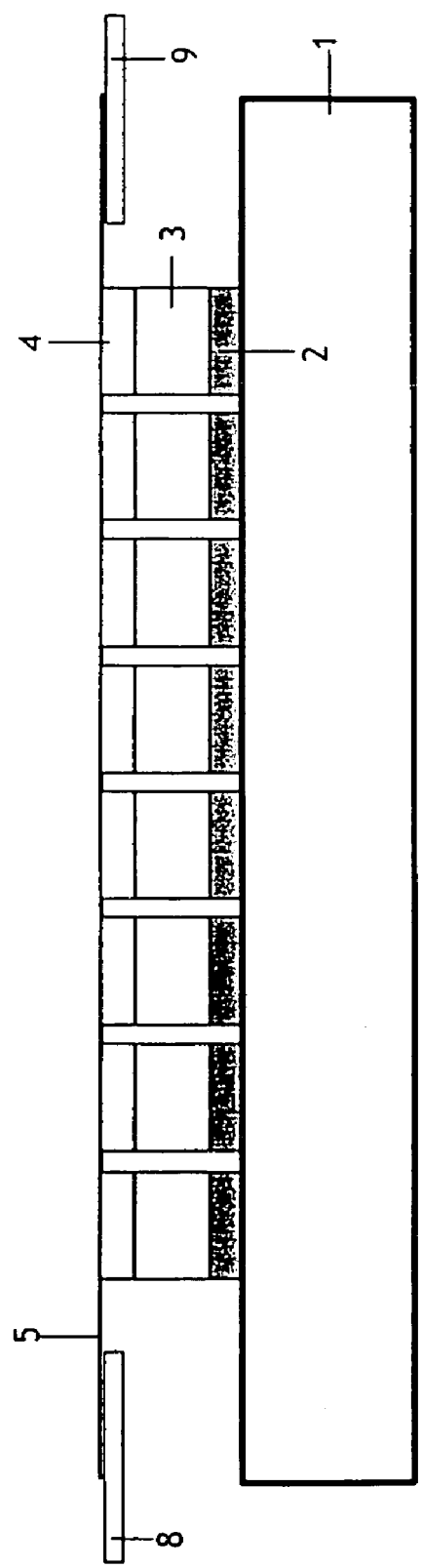
Figure 4:
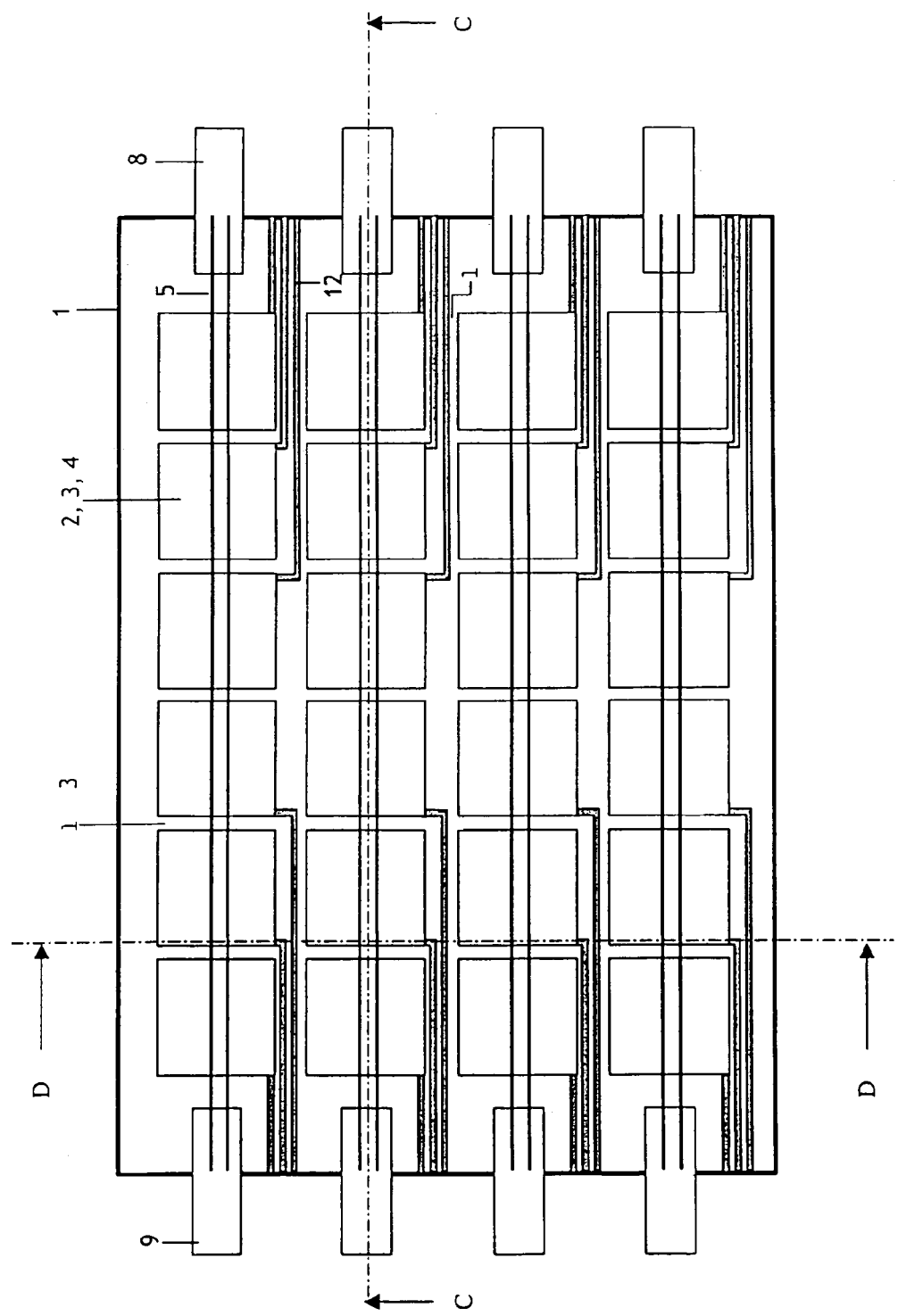
Figure 5:
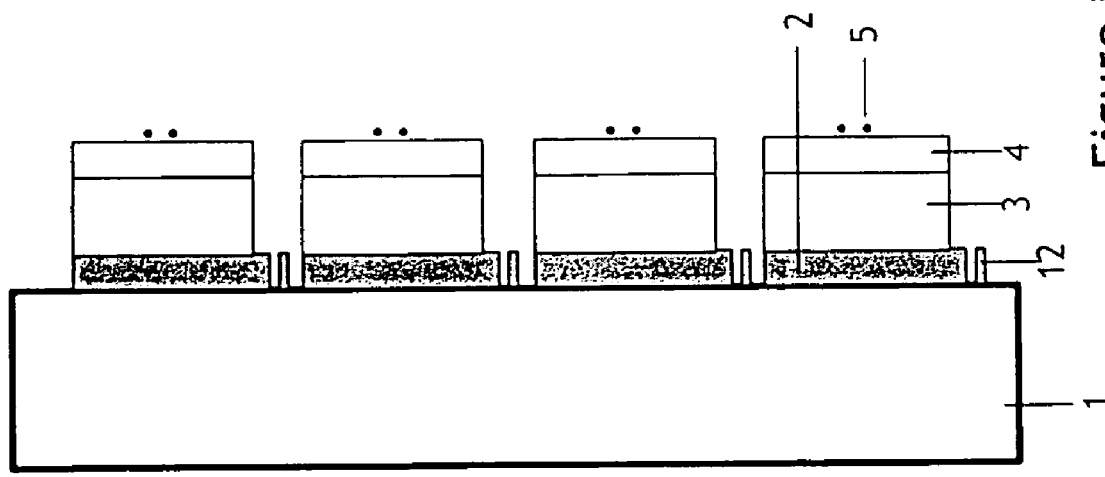
Figure 6:
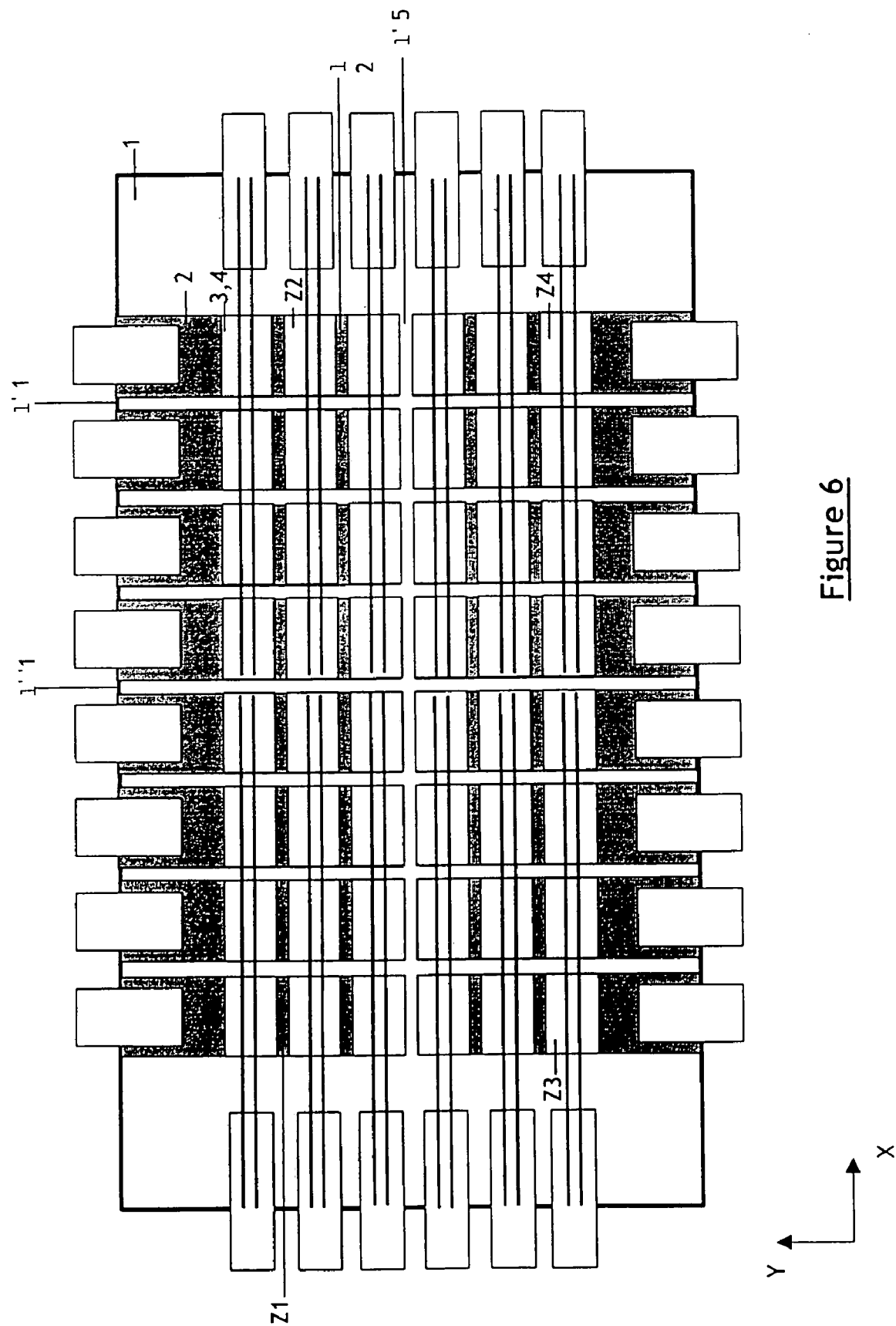
Figure 7:
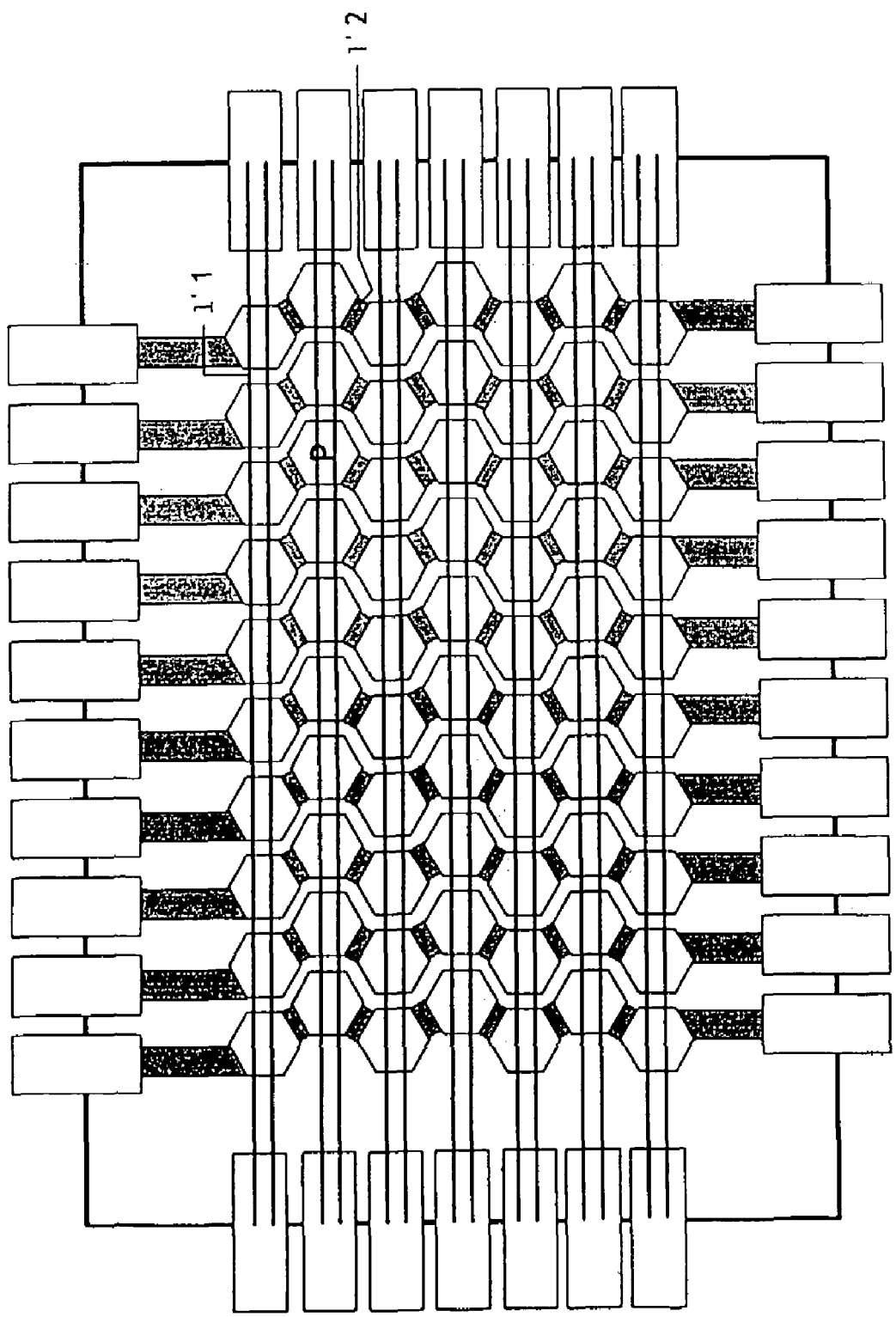
Figure 9:
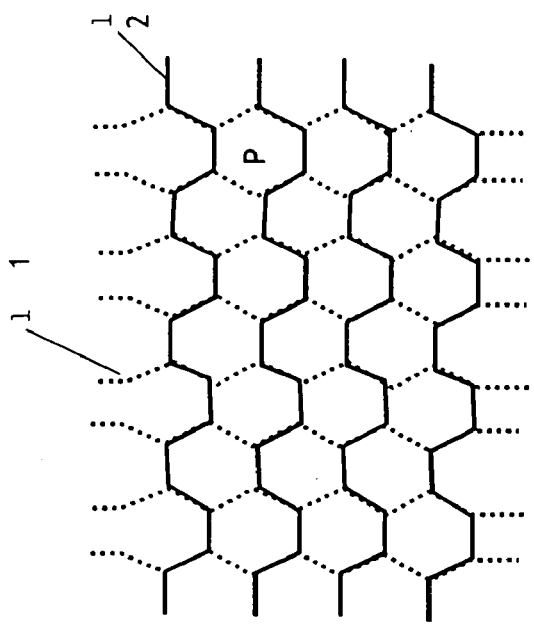
Figure 8:
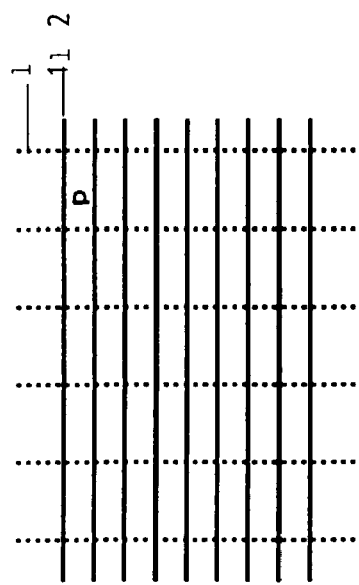
Figure 10:
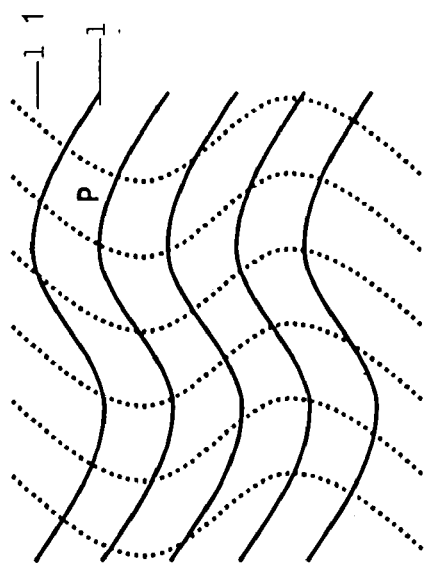

The invention will be detailed below with nonlimiting exemplary embodiments, with reference to the following figures:

FIG. 1: a representation in top view of an "all-solid" electrochromic glazing according to the invention, FIGS. 2 and 3: the representation of the same glazing along sections AA and BB of FIG. 1, FIG. 4: a representation in top view of a second type of "all-solid" glazing according to the invention, FIG. 5: the representation of the glazing according to FIG. 4 along the section DD of said figure, FIG. 6: a representation in top view of a variant of the glazing according to FIG. 1, FIG. 7: a representation in top view of a third type of "all-solid" glazing according to the invention, FIGS. 8, 9 and 10: a schematic representation of various pixel shapes for the electrochromic glazing according to the invention.

These figures are schematic so as to make them easier to examine, and do not necessarily comply with the scale between the various elements they represent.

They relate to an "all-solid" electrochromic glazing, in a laminated structure with two glass panes.

FIG. 1 shows a glass pane 1 (8×10 $cm^2$ in size) provided with a lower conducting layer 2, with an active stack 3, surmounted by an upper conducting layer 4, with a network of conducting wires 5 above the upper conducting layer and embedded in the surface of a polyurethane, PU, (or ethylene vinyl acetate, EVA,) sheet which is not shown for increased clarity. The glazing also comprises a second glass pane, not shown for the sake clarity, above the EVA sheet. The two glass panes and the EVA sheet are secured by a known laminating or calandering technique, by heating possibly under pressure.

The lower conducting layer 2 is a double layer consisting of a 50 nm SiOC first layer surmounted by a 400 nm $F:SnO_2$ second layer (two layers preferably deposited successively by CVD on float glass before cutting). It is possible to use other dopants for $SnO_2$, for example antimony Sb. It is also possible to use other doped oxides, in particular doped zinc oxide of the Al:ZnO type.

Alternatively, it may involve a double layer consisting of an $SiO_2$-based first layer which may or may not be doped (in particular doped with aluminum or boron) of about 20 nm surmounted by an ITO second layer of about 100 to 350 nm (the two layers preferably deposited successively in vacuo, by magnetic-field-assisted reactive sputtering in the presence of oxygen possibly with heat).

The active stack 3 is broken down as follows:
a first layer of anodic electrochromic material comprising 40 to 100 nm of (hydrated) iridium oxide or 40 nm to 400 nm of hydrated nickel oxide which may or may not be combined with other metals.
a 100 nm layer of tungsten oxide,
a 100 nm second layer of hydrated tantalum oxide or of hydrated silica oxide,
a 370 nm second layer of cathodic electrochromic material based on tungsten oxide $WO_3$.

All these layers are deposited in a known manner by magnetic-field-assisted reactive sputtering.

The upper conducting layer is a layer of 100 to 300 nm ITO, also deposited by magnetic-field-assisted reactive sputtering.

The conducting wires 5 are mutually parallel straight wires made of tungsten (or of copper), possibly coated with carbon, there being deposited on the PU sheet by a technique known in the field of wire-heated windshields, for example described in patents EP-785 700, EP-553 025, EP-506 521 and EP-496 669. Schematically, it involves using a heated press roller which presses the wire into the surface of the polymer sheet, the press roller being fed with wire from a supply coil by means of a wire-guide device.

The PU sheet has a thickness of about 0.8 mm.

The two glass panes are made from silica-soda-lime standard flat clear glass, each about 2 mm thick.

The invention is applicable in the same way to curved and/or toughened glass panes.

Similarly, at least one of the glass panes may be bulk-tinted, in particular tinted in blue or in green, in gray, bronze or brown.

The substrates used in the invention may also be polymer-based. It is also noted that the substrates may have very varied geometrical shapes: they may be squares or rectangles, but also any polygon or profile which is at least partly curved, defined by rounded or undulating outlines (circle, oval, "waves", etc.).

Moreover, at least one of the two glass panes may be provided (on the face which is not provided with the electrochromic or equivalent system) with a solar protection coating, for example based on a stack of thin layers deposited by sputtering and comprising at least one silver layer. In this way, it is possible to have a structure of the type: glass/electrochromic system/thermoplastic (PVB or PU or EVA) sheet/solar protection coating/glass.

It is also possible to deposit the electrochromic system via one or more functional thin layers, for example solar protection layers, rather than directly on its carrier substrate.

It is also possible to deposit the sun protection coating on a sheet of flexible polymer of the PET (polyterephthalate) type, with a structure of the type: glass/electrochromic system/thermoplastic (PVB or PU or EVA) sheet/PET with solar protection layers/thermoplastic (PVB) sheet/glass, rather than on one of the glass panes.

For examples of solar protection coatings, reference may be made to patents EP 826 641, EP 844 219, EP 847 965, WO 99/45415 and EP 1 010 677.

In the configuration shown in FIG. 1, the aim is to manufacture electrochromic glazing in the form of a matrix of pixels. In this example, the pixels are of rectangular shape. Each pixel has a size of about 1 cm×1 cm. These pixels are arranged in six rows (i) along an axis X and in eight columns (ii) along an axis Y, the X and Y axes being mutually orthogonal.

Of course, the pixels may have other shapes, and be square, circular, triangular, hexagonal, etc., as was seen above. Their dimensions may also vary depending on the desired application, and the X et Y axes may make an acute or obtuse angle to each other. These shapes and dimensions are in fact determined by the way in which the various layers of the system are etched and how the etchings are superimposed.

In the case of FIG. 1, the lower electrode 2 is in the form of a layer covering the majority of the substrate 1. However, it leaves two bare strips of glass 6, 7 of rectangular shapes at the two ends of the glass pane (along its largest dimension, along the X axis). These regions 6, 7 may be left bare by a system for masking the glass pane during deposition. They may also be obtained by local ablation of the layer initially covering the entire surface of the glass pane, especially using a laser.

Moreover, the margins of the lower electrode 2 are set along mutually parallel incision lines 11, with a pitch of 10 mm, along the X axis and over the entire width of the glass pane. It is these lines, defining a one-dimensional pattern A, which will delimit the eight columns mentioned above. These incision lines also affect the active stack 3 and the upper electroconductive layer 4, since they are made after depositing all of the layers.

The margins of the active system 3 and the electroconductive layer 4 are also set by incision lines 12, all mutually parallel with a 10 mm pitch along the Y axis over the entire length of the glass pane covered with the active stack 3 and the electroconductive layer 4.

Thus, the stack 3 and the upper electrode 4 have the same pattern, namely series of incision lines 11, 12 intersecting at a right angles and thus defining the desired tiling of the pixels.

Next arises the question of addressing each of these pixels, the way in which they can be supplied selectively with current and without any risk of short-circuits.

With regard to the columns of pixels: at each end of each column, there is a portion S1, S2 of lower electrode 2 which is not covered with the stack of layers 3, 4, and electrically insulated from the portion S'1, S'2 of the electrode belonging to the column adjacent to the column in question. Each of these electrode portions S1, S2 is fitted with a clip 10, 11. These pairs of clips extend beyond the glass, as is shown in FIG. 2 and serve as current supply for each of the columns in question. All the pixels of a column of pixels are therefore at an equipotential on the side of the lower electrode 2.

With regard to the rows of pixels: each row, the last layer of which consists of a portion of upper electrode 4, is in electrical contact with two metal wires 5 (for example tungsten wires 25 μm in diameter). These wires are mutually parallel and placed along the X axis of each row. They extend beyond each of the ends of each of the rows of pixels. In this way, they can be electrically connected to clips 8, 9, as shown in FIG. 3. One pair of clips is associated with each row of pixels. Electrical wires 5 are used, insofar as, on the side of the upper electrode 4, there are pads which are completely insulated, physically and electrically from each other. Here again, all the pixels of the same row are at an equipotential, but on the side of the upper electrode 4 this time.

Specifically, in order that a given pixel becomes colored, it is necessary to electrically supply the clip of the "correct" column of pixels on the side of the lower electrode, and that of the "correct" row of pixels on the side of the upper electrode, the intersection being the pixel in question.

FIG. 4 illustrates the situation in which, for the lower electrode 2, an incision of mutually perpendicular lines 13, 14 is chosen, as was only the case for the active layers 3 and for the upper electrode 4 in the previous example: the pads are now completely isolated electrically both on the side of the lower electrode 2 and on the side of the upper electrode 4, which requires individual current supplies for each of the pixels on the side of the lower electrode 2. It may involve wires placed on the substrate 1, each pixel having a wire connected electrically to their "lower" electrode portion 2, these wires being able to be deposited by photolithographic etching before, after or during deposition of the lower electrode 2). This is the case illustrated in FIGS. 4 and 5: the current supplies are conducting wires (or strips) 12 made by etching the lower electrode 2. These supplies preferably have a width of 80 to 300 μm and are separated from each other by the same distance.

Provision is also made within the scope of the invention for each pixel to be electrically supplied independently also from the side of the upper electrode 4, each pixel being connected to its own current supply wires.

The fact that the clips are deposited on the periphery of the active layers prevents any loss of active surface. The resolution of the system is very good, since the pixels are only separated by the width of the incision lines 11 and 12, which may be very small, in particular 80 μm, by virtue of laser etching technology.

The number and the diameter of conducting wires is also variable. These parameters depend on the size of the pixel and, depending on the application, the degree of visibility of the wires which is judged acceptable (particularly in the bleached state).

In general, the current supplies of the lower conductive layer, on the one hand (that is to say, with reference to FIG. 4 for example, the wires or strips 12) and the current supplies to the upper conductive layer (that is to say the wires 5, still with reference to FIG. 4 by way of example) which supply the pixels may be of variable dimensions/conductivity depending on whether they supply the "peripheral" pixels, close to the clips 8, 9, or the "central" pixels, further away from these clips. This is because, so that all the pixels "react" as uniformly as possible, especially when there are many of them, it may be useful to provide leads which are more conductive the further the pixel is away from the border of the device, to the supply clips (in order to compensate for ohmic losses).

By way of example, provision is made for the conducting strips 12 of FIG. 4 to be wider (therefore more conductive) when they supply, in the same row (horizontal in FIG. 4) of pixels, the four "central" pixels compared to the two peripheral pixels close to the clips 8, 9. The thickness of the wires 5 may also vary over their length for the same purpose.

FIG. 6 illustrates a third example according to the invention. It is similar to the example of FIG. 1, but has two differences:
  firstly, the lower electrode 2 has an additional incision line 15, which is perpendicular to the incision lines 11, so as to divide the glazing longitudinally into two regions of equal area, on either side of this line 15,
  secondly, the conducting wires 5 are cut in the middle, so as to divide the glazing into two regions of equal area over its width.

Glazing consisting of a given number of pixels grouped into four groups of pixels Z1, Z2, Z3 and Z4 which are completely independent of each other has thus been formed. It is of course possible to envision using only the additional incision line 15 or only the fact of cutting the wires 5, especially if only two independent groups of pixels are required instead of four.

FIG. 7 shows a fourth type of glazing according to the invention. It is similar to the example illustrated in FIG. 1. The only difference relates to the shape of the pixels, determined by the way in which the layers 2, 3 and 4 have been incised. In the case of FIG. 7, the incision lines 11 of the layers 2, 3 and 4 are no longer straight: they are lines broken in a repeat pattern. Similarly the incision lines 12 are also broken lines, the superposition of these etchings leading to pixels of hexagonal shape.

FIGS. 8, 9 and 10 are variants of the glazing according to FIG. 7. In these three figures, the dotted lines correspond to the incision lines 11 and the solid lines correspond to the incision lines 12. In the case of FIG. 8, the pixels P have a rectangular shape (FIG. 1). In the case of FIG. 9, the pixels have a hexagonal shape (FIG. 7). In the case of FIG. 10, the pixels have the shape of deformed squares, since the incision lines 11 and 12 are undulating.

There are many variants which are part of the invention: as has been seen, the shape and the size of the pixels can vary very widely. The way in which the layers are incised can also vary. Thus, it is possible firstly to incise the lower electrode 2, before depositing the active layers 3. It is also possible to deposit it directly with the desired pattern by photolithographic etching. The pixels can be grouped together in regions or not.

A considerable advantage of the invention is that the "active" layers of all the pixels are deposited in the same operation on a single substrate.

What is claimed is:

1. An electrically controllable device comprising:
   (i) a substrate,
   (ii) a lower electrode comprising a plurality of strips, each strip extending in a first direction,
   (iii) an upper electrode comprising a plurality of conductors, each conductor extending in a second direction,
   (iv) n regions of electrochromic material comprising a stack comprising a first active layer, a second active layer, and an electrolyte disposed between the first active layer and the second active layer,
   (v) a first power supply for providing an electric current to the lower electrode, and
   (vi) a second power supply for providing an electric current to the upper electrode;
   wherein the lower electrode is closer to the substrate than the upper electrode;
   the lower electrode contacts the first active layer;
   the upper electrode contacts the second active layer;
   the lower electrode and the upper electrode intersect each other in n intersection regions;
   the n regions of electrochromic material are disposed between the upper electrode and the lower electrode in each of the n intersection region to define n pixels wherein the pixels are arranged in x row parallel to the first direction and y columns parallel to the second direction, with each pixel comprising a level comprising a portion of the lower electrode, a level comprising a region of electrochromic material, and a level comprising a portion of the upper electrode; and
   each of the n pixels are physically separated from each other;
   wherein at least a portion of at least one face of the stack does not contact a solid insulating material.

2. The device of claim 1, wherein each of the pixels is in the shape of a square, rectangle, hexagon, polygon, or closed curve.

3. The device of claim 2, wherein each of the pixels in a row are at an equipotential at the level of the upper electrode.

4. The device of claim 1, wherein the conductor is in the form of a strip or wire.

5. The device of claim 4, wherein the conductor is a metal wire with a diameter ranging from 10 to 100 micrometers.

6. The device of claim 4, wherein the conductor is a strip of doped metal oxide of the ITO type deposited on strips of a flexible polymer of PET.

7. The device of claim 4, further comprising a sheet of thermoplastic polymer selected from the group consisting of PU, PVB, and EVA to maintain contact between the conductor and the n regions of electrochromic material.

8. The device of claim 1, wherein each of the pixels in a column are at an equipotential at the level of the lower electrode.

9. The device of claim 1, wherein each row is linear in the first direction, each column is linear second direction, and the rows and columns are orthogonal to each other.

10. The device of claim 1, wherein the electric current to each pixel can be independently controlled.

11. The device of claim 1, wherein the first power supply and the second power supply are placed outside the region of the substrate.

12. A sunroof, a side window, or a rear window of a vehicle comprising the device of claim 1.

13. A windshield of a vehicle comprising the device of claim 1.

14. The windshield of claim 13, wherein the device is located in the upper part of the windshield.

15. The windshield of claim 13, further comprising a light sensor to activate the first power supply and the second power supply.

16. The windshield of claim 15, wherein the device is located in the middle of the windshield.

17. A panel for displaying graphical or alphanumeric information comprising the device of claim 1.

* * * * *